G. A. WARNECKE.
SEED PLANTING GAGE.
APPLICATION FILED MAY 29, 1920.
1,357,013.
Patented Oct. 26, 1920.
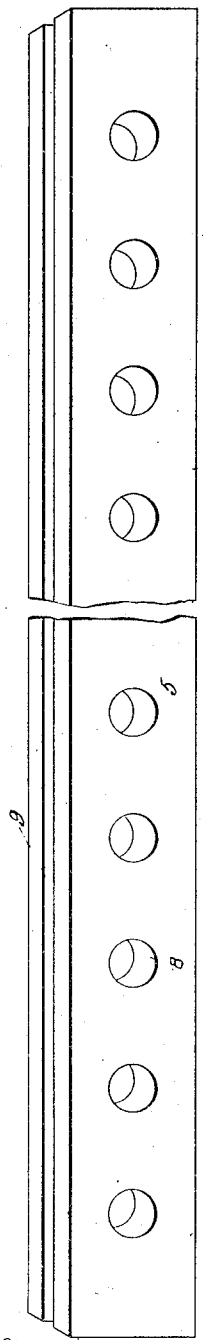
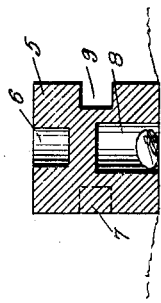
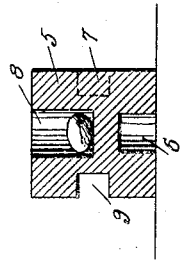
WITNESSES
INVENTOR
G. A. Warnecke
ATTORNEYS

UNITED STATES PATENT OFFICE.

GUSTAV A. WARNECKE, OF NEW YORK, N. Y.

SEED-PLANTING GAGE.

1,357,013.  Specification of Letters Patent.  Patented Oct. 26, 1920.

Application filed May 29, 1920. Serial No. 385,262.

*To all whom it may concern:*

Be it known that I, GUSTAV A. WARNECKE, a citizen of the United States, and a resident of the city of New York, Ridgewood, borough of Queens, in the county of Queens and State of New York, have invented a new and Improved Seed-Planting Gage, of which the following is a full, clear, and exact description.

The present invention relates to new and useful improvements in devices for use in planting seeds, and it pertains more particularly to a device for planting seeds in small quantities.

It is the primary object of the invention to provide a device by the use of which seeds may be properly spaced with relation to each other.

It is a further object of the invention to provide a device in which the seeds may be spaced in proper position with respect to each other before the planting.

It is a still further object of the invention to so construct a device of this character that the seeds may all be planted at a single operation thus insuring a proper spacing of the seeds.

With the above and other objects in view, reference is had to the accompanying drawings in which, Figure 1 is a perspective view of a device constructed in accordance with the present invention.

Fig. 2 is a transverse sectional view of the device showing the same in position before the seeds are deposited for planting.

Fig. 3 is a similar view of the device showing the manner of depositing the seeds for planting.

Referring more particularly to the drawings the device comprises an elongated member 5 preferably square in cross section. On three of its sides this rectangular member is provided with a plurality of spaced recesses 6, 7, and 8. On its fourth side the rectangular member is provided with a continuous groove 9.

The spaces between the recesses on one side of the rectangular member 5 will vary with respect to the recesses in each of the two remaining sides, and the recesses 8 are of larger dimension and deeper than the recesses 7 and 9.

By this construction seeds of various sizes may be planted and in view of the spaces between the several recesses varying the seeds may be varied at will.

The groove on the fourth side of the member 5 is adapted to be employed when it is desired to plant seeds in rows with no space between the seeds, they being deposited in the groove 9 on the bottom wall thereof.

The device is placed or positioned as shown in Fig. 2 with the recesses selected positioned upwardly as shown. The seeds are then placed in the recesses and the device is rocked to the position shown in Fig. 3, in which position the seeds will be deposited on the ground in proper position for planting. This operation is repeated until the desired quantity of seeds is planted.

What is claimed is:

1. A device of the character described comprising a rectangular body provided on three of its sides with a plurality of seed receiving recesses, and upon its fourth side with a continuous seed receiving groove.

2. A device of the character described comprising a member having a plurality of faces, certain of which are provided with a plurality of seed receiving recesses one of said faces having a continuous seed receiving groove.

3. A device for planting seeds comprising a body substantially square in cross section, and provided on certain of its faces with seed receiving recesses, the spaces between the seed receiving recesses on each face varying with respect to those on each of the remaining faces.

GUSTAV A. WARNECKE.